US012590983B2

(12) United States Patent
Kubo et al.

(10) Patent No.: US 12,590,983 B2
(45) Date of Patent: Mar. 31, 2026

(54) FLUID DEVICE AND METHOD FOR CONTROLLING FLUID DEVICE

(71) Applicant: SEIKO EPSON CORPORATION, Tokyo (JP)

(72) Inventors: Keita Kubo, Matsumoto (JP); Chikara Kojima, Matsumoto (JP); Mitsuru Miyasaka, Shiojiri (JP); Yoshio Arai, Shiojiri (JP); Hiroto Tomioka, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 362 days.

(21) Appl. No.: 18/343,077

(22) Filed: Jun. 28, 2023

(65) Prior Publication Data

US 2024/0003932 A1     Jan. 4, 2024

(30) Foreign Application Priority Data

Jun. 29, 2022     (JP) ................................. 2022-104948

(51) Int. Cl.
*G01P 5/24*          (2006.01)
*B01D 21/28*          (2006.01)
(Continued)

(52) U.S. Cl.
CPC ............ *G01P 5/241* (2013.01); *B01D 21/283* (2013.01); *B01D 21/34* (2013.01); *C02F 1/008* (2013.01);
(Continued)

(58) Field of Classification Search
None
See application file for complete search history.

(56)               References Cited

U.S. PATENT DOCUMENTS 3,019,390  A  *   1/1962   Macmillan ............. G01R 25/00
                                                       324/76.78
2004/0199340  A1*  10/2004   Kersey ................... G01P 5/245
                                                       702/50
(Continued)

FOREIGN PATENT DOCUMENTS

CN          106853381 A      6/2017
JP          2013-215217 A    10/2013
(Continued)

OTHER PUBLICATIONS

Kim, Tae Hyun, Yang Wang, C. Ryan Oliver et al.: "A temporary indwelling intravascular aphaeretic system for in vivo enrichment of circulating tumor cells"; Nature Communications; https://doi.org/10.1038/s41467-019-09439-9; 8 pp (2019).

*Primary Examiner* — Richard C Gurtowski
(74) *Attorney, Agent, or Firm* — Harness, Dickey & Pierce, P.L.C.

(57)               ABSTRACT

A fluid device 10 includes: a flow path 20 through which a fluid containing a fine particle flows; an ultrasonic transmitter 60 configured to transmit an ultrasonic wave to the fluid in the flow path 20 in response to an input of a drive signal; a flow velocity measurement unit 40 configured to measure a flow velocity of the fluid in the flow path 20; and a controller 70 configured to control the ultrasonic transmitter 60. The controller 70 sets an amplitude of the drive signal according to a measured flow velocity that is a flow velocity measured by the flow velocity measurement unit 40, and inputs the drive signal having the set amplitude to the ultrasonic transmitter 60.

10 Claims, 6 Drawing Sheets

(51) Int. Cl.
  B01D 21/34          (2006.01)
  C02F 1/00           (2023.01)
  C02F 1/36           (2023.01)
  G01N 1/20           (2006.01)
(52) U.S. Cl.
  CPC ............. C02F 1/36 (2013.01); G01N 1/2035
                    (2013.01); C02F 2209/40 (2013.01)

(56)                   References Cited

U.S. PATENT DOCUMENTS

| | | | |
|---|---|---|---|
| 2006/0124555 A1 | 6/2006 | Nakatani | |
| 2010/0097605 A1* | 4/2010 | Murakami | ........... B01D 65/102 |
| | | | 356/337 |
| 2010/0248358 A1 | 9/2010 | Yoshioka | |
| 2014/0048491 A1* | 2/2014 | Johnson | ................ C02F 1/5209 |
| | | | 210/741 |
| 2021/0060229 A1 | 3/2021 | Nagrath et al. | |
| 2022/0023776 A1* | 1/2022 | Gachelin | ............. A61M 1/3678 |

FOREIGN PATENT DOCUMENTS

| | | | |
|---|---|---|---|
| JP | 2022-032399 A | 2/2022 | |
| WO | 2005-058459 A1 | 6/2005 | |

* cited by examiner

*FIG. 5*

FLUID DEVICE AND METHOD FOR CONTROLLING FLUID DEVICE

The present application is based on, and claims priority from JP Application Serial Number 2022-104948, filed Jun. 29, 2022, the disclosure of which is hereby incorporated by reference herein in its entirety.

BACKGROUND

1. Technical Field

The present disclosure relates to a fluid device and a method for controlling a fluid device.

2. Related Art

In the related art, a device that separates fine particles dispersed in a fluid from the fluid is known. For example, a fluid device disclosed in WO2005/058459 includes a substrate at which a flow path is formed and a piezoelectric element provided at the substrate. Ultrasonic waves generated by the piezoelectric element are transmitted into the flow path via the substrate, and generate standing waves in a fluid in the flow path. The fine particles in the fluid are converged in a predetermined range in the flow path by a pressure gradient of the fluid formed by the standing waves, and a concentrated solution containing the converged fine particles is recovered.

In the fluid device as described in WO2005/058459 described above, it is desirable to adjust a size of the fine particles that can be captured. However, when an output of the fluid device (that is, an amplitude of the ultrasonic waves) is adjusted such that the fine particles having a desired size can be captured, the size of the fine particles that can be captured changes due to a change in a flow velocity of the fluid. As a result, it is difficult to stably capture the fine particles having the desired size.

SUMMARY

A fluid device according to a first aspect of the present disclosure includes: a flow path through which a fluid containing a fine particle flows; an ultrasonic transmitter configured to transmit an ultrasonic wave to the fluid in the flow path in response to an input of a drive signal; a flow velocity measurement unit configured to measure a flow velocity of the fluid in the flow path; and a controller configured to control the ultrasonic transmitter, in which the controller sets an amplitude of the drive signal according to a measured flow velocity that is a flow velocity measured by the flow velocity measurement unit, and inputs the drive signal having the set amplitude to the ultrasonic transmitter.

A method for controlling a fluid device according to a second aspect of the present disclosure is a method for controlling the fluid device including a flow path through which a fluid containing a fine particle flows, an ultrasonic transmitter configured to transmit an ultrasonic wave to the fluid in the flow path in response to an input of a drive signal, and a flow velocity measurement unit configured to measure a flow velocity of the fluid in the flow path, in which an amplitude of the drive signal is set according to a measured flow velocity that is a flow velocity measured by the flow velocity measurement unit, and the drive signal having the set amplitude is input to the ultrasonic transmitter.

BRIEF DESCRIPTION OF THE DRAWINGS

FIG. 5 is a diagram showing a flow path system in a fluid device according to a modification.

DESCRIPTION OF EXEMPLARY EMBODIMENTS

First Embodiment

Figure 1:
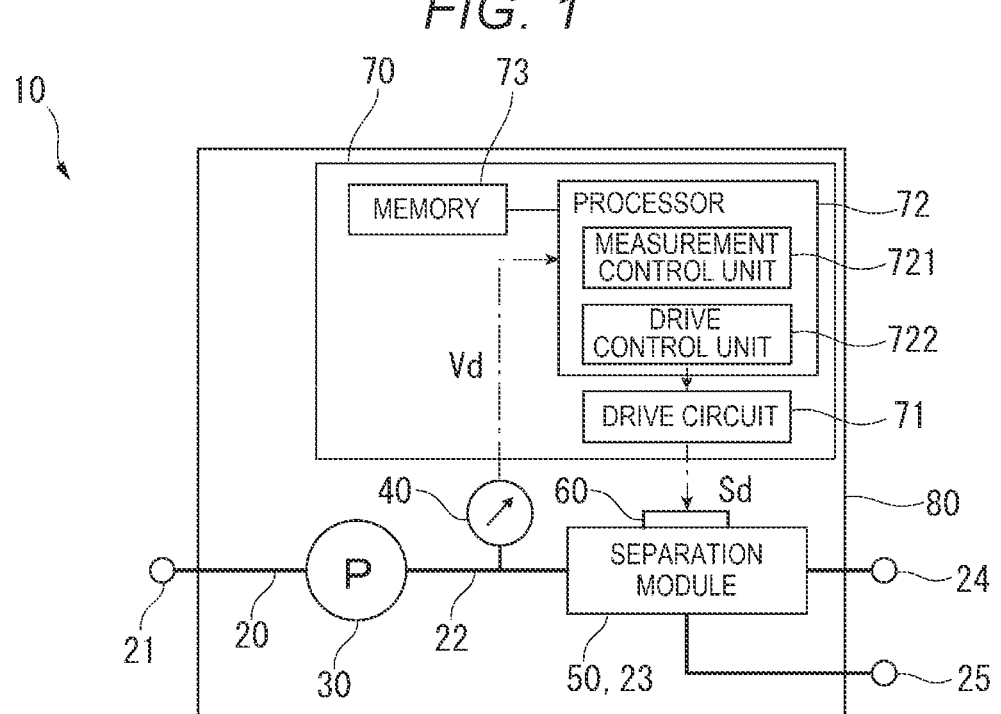
FIG. 1 is a schematic diagram showing a fluid device according to a first embodiment.

A fluid device according to the first embodiment will be described with reference to FIGS. 1 and 2.
Configuration of Fluid Device As shown in FIGS. 1 and 2, a fluid device 10 according to the embodiment includes: a flow path 20 through which a fluid S containing fine particles M flows; a pump that generates a flow of the fluid S in the flow path a flow velocity measurement unit 40 that measures a flow velocity of the fluid S in the flow path 20; a separation module 50 including a part of the flow path 20; a controller 70 that controls an operation of the fluid device 10; and a housing 80 that houses the flow path 20, the pump 30, the flow velocity measurement unit 40, the separation module 50, and the controller 70.

The fluid device 10 according to the embodiment can recover the fluid S in which the fine particles M are concentrated by capturing the fine particles M in the fluid S in the flow path 20 in the separation module 50 by ultrasonic waves. Further, the fluid device 10 according to the embodiment measures the flow velocity of the fluid S that flows through the flow path 20, and sets or adjusts an output of the fluid device 10 (that is, an amplitude of the ultrasonic waves) based on a measurement result.

In the embodiment, the fluid S is not particularly limited, and is, for example, any liquid such as water or blood. The fine particles M are not particularly limited, and are, for example, microfibers or cells. In FIG. 2, in order to simplify the drawing, sizes of a plurality of fine particles M are the same, but it is assumed that fine particles M having various sizes are dispersed in the fluid S.

Figure 2:
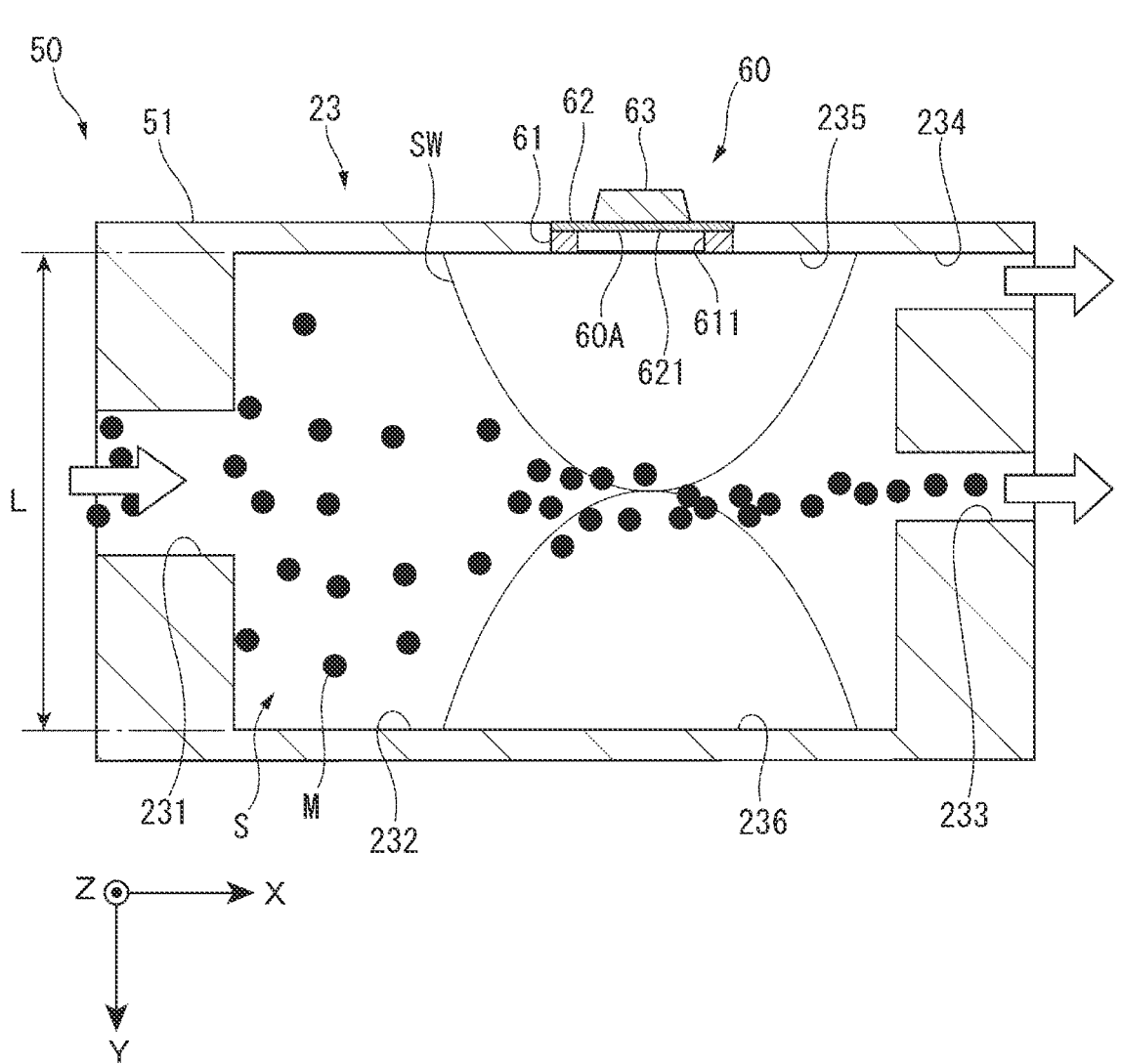
FIG. 2 is a cross-sectional view schematically showing a separation module in the fluid device according to the first embodiment.

As shown in FIG. 1, the flow path 20 includes: an inflow port 21 through which the fluid S flows in; a communication flow path 22 that allows the inflow port 21 and the separation module 50 to communicate with each other; a separation flow path 23 included in the separation module 50; a concentration outlet 24 that discharges the fluid S containing the fine particles M captured by the separation module 50 (that is, a concentrated solution); and a discharge port 25 that discharges the fluid S other than the concentrated solution from the separation module 50. The concentration outlet 24 and the discharge port 25 correspond to a discharge port of the present disclosure.

As the pump 30, any device that generates the flow of the fluid S in the flow path 20, for example, a peristaltic pump or a diaphragm pump can be used. In the embodiment, the pump 30 is provided at any position of the communication flow path 22.

As the flow velocity measurement unit 40, any device that measures the flow velocity of the fluid S in the flow path 20, for example, an ultrasonic wave flowmeter can be used. In the embodiment, the flow velocity measurement unit 40 is provided at a position downstream of the pump 30 in the communication flow path 22, but may be provided at a position upstream of the pump 30.

As shown in FIG. 2, the separation module 50 includes the separation flow path 23 that is a part of the flow path 20, and an ultrasonic transmitter 60 that transmits the ultrasonic waves to the fluid S in the separation flow path 23.

The separation flow path 23 is formed in, for example, a flow path substrate 51. The flow path substrate 51 is implemented by a base substrate having a concave groove corresponding to the separation flow path 23, and a lid substrate that covers the concave groove. The substrates are not particularly limited, and for example, glass substrates or silicon substrates can be used as the substrates. Further, the separation flow path 23 includes: an inflow flow path 231 through which the fluid S flows in from the communication flow path 22; a flow path main body 232 in which standing waves are formed; a concentration flow path 233 that selectively causes the fluid S containing the fine particles captured by the standing waves to flow; and a discharge flow path 234 that selectively causes the fluid S other than the fluid S containing the fine particles captured by the standing waves to flow.

The flow path main body 232 includes a first wall surface 235 and a second wall surface 236 that face each other in any flow path width direction (Y direction) orthogonal to a flow direction (X direction) of the fluid S. A flow path width L between the first wall surface 235 and the second wall surface 236 is a known value.

The concentration outlet 24 is coupled to the concentration flow path 233, and the discharge port 25 is coupled to the discharge flow path 234.

The ultrasonic transmitter 60 includes an ultrasonic wave transmission surface 60A that constitutes a part of the first wall surface 235, and can transmit the ultrasonic waves to the fluid S by the ultrasonic wave transmission surface 60A facing the fluid S in the flow path main body 232.

Specifically, the ultrasonic transmitter 60 includes an element substrate 61, a vibration film 62 supported by the element substrate 61, and a piezoelectric element 63 provided at the vibration film 62. The element substrate 61 is implemented by a semiconductor substrate of Si or the like, and is provided with an opening portion 611 that penetrates the element substrate 61 in a thickness direction. The vibration film 62 is implemented by a laminate or the like obtained by laminating a plurality of kinds of films, for example, a SiO₂ film and a ZrO₂ film, is supported by the element substrate 61, and closes the opening portion 611. An acoustic matching layer may be provided in the opening portion 611. A portion of the vibration film 62, which overlaps with the opening portion 611 in a plan view in the thickness direction of the element substrate 61, constitutes a vibrator 621 that transmits the ultrasonic waves. The piezoelectric element 63 is provided at a position overlapping with the vibrator 621. Although illustration is omitted, the piezoelectric element 63 is implemented by sequentially laminating a lower electrode, a piezoelectric film, and an upper electrode on the vibration film 62.

In such an ultrasonic transmitter 60, when a drive signal Sd is input from a drive circuit 71 described later to the piezoelectric element 63, the piezoelectric film of the piezoelectric element 63 expands and contracts, so that the vibrator 621 flexurally vibrates in the thickness direction of the element substrate 61. The flexural vibration of the vibrator 621 is converted into compressional waves of the fluid S, so that the ultrasonic waves are propagated from the ultrasonic transmitter 60 to the fluid S. Here, since the thickness direction of the element substrate 61 is a direction along the flow path width direction of the flow path main body 232 (Y direction), the ultrasonic waves are transmitted in the flow path width direction (Y direction).

As shown in FIG. 1, the controller 70 includes the drive circuit 71 that drives the ultrasonic transmitter 60, a processor 72 that performs various controls, and a memory 73.

The drive circuit 71 outputs the drive signal Sd having a predetermined frequency to the ultrasonic transmitter 60. An amplitude of the drive signal Sd (that is, a drive voltage Vd) corresponds to an amplitude of the ultrasonic waves transmitted from the ultrasonic transmitter 60.

The processor 72 functions as a measurement controller 721 and a drive controller 722 by executing a program stored in the memory 73. Details of the measurement controller 721 and the drive controller 722 will be described later.

The memory 73 is a storage device that stores various programs and various kinds of data. For example, in the memory 73, a drive table or an arithmetic coefficient indicating a correspondence relationship between a measured flow velocity V and the drive voltage Vd is stored. The drive table or the arithmetic coefficient may be prepared for each size of the fine particle M to be captured. The size of the fine particle M may be classified into any numerical range such as a dimension or a volume of the fine particle M.

The housing 80 houses the flow path 20, the flow velocity measurement unit 40, the separation module 50, and the controller 70. Accordingly, the fluid device 10 is integrally formed. The housing 80 is provided with the inflow port 21, the concentration outlet 24, and the discharge port 25 of the flow path 20. Further, in the housing 80, a battery that supplies power to portions of the fluid device 10 may be housed. Further, although not particularly limited, the fluid device 10 may be miniaturized by housing the portions in the housing 80 of 100 cc or less.

Control Mechanism of Fluid Device

A mechanism for concentrating the fine particles M in the fluid S in the fluid device 10 according to the embodiment will be described.

The ultrasonic waves transmitted from the ultrasonic transmitter 60 are radially diffused in the fluid S as spherical waves, and ultrasonic waves that travel along the flow path width direction (Y direction) among the ultrasonic waves transmitted from the ultrasonic transmitter 60 are repeatedly reflected between the first wall surface 235 and the second wall surface 236, so that the standing waves SW are generated in the flow path main body 232.

Here, when a frequency of the ultrasonic waves transmitted from the ultrasonic transmitter 60 is f, a mode order of the standing waves SW is m, a sound velocity in the fluid S is c, and the flow path width of the flow path 20 is L, the standing waves SW are formed in a case where a condition of the following Equation (1) is satisfied.

$$f = \frac{mc}{2L} \tag{1}$$

As shown in FIG. 2, when the standing waves SW of a first-order mode are generated, a node appears at a central portion of the flow path main body 232 in the flow path width direction (Y direction), and anti-nodes appear at both end portions of the flow path main body 232 in the flow path width direction. In this case, the fine particles M whose acoustic impedance is higher than that of the fluid S converge toward the node of the standing waves SW (acoustically converge), that is, the central portion of the flow path main body 232 in the flow path width direction during a process in which the fluid S flows through the flow path main body 232. The fluid S containing the converged fine particles M (concentrated solution) is discharged from the concentration outlet 24 via the concentration flow path 233, and the fluid S other than the concentrated solution is discharged from the discharge port 25 via the discharge flow path 234. That is, the fine particles M are separated from the fluid S as the concentrated solution.

In the embodiment, in order to simplify the description, an example in which the standing waves SW of the first-order mode are generated is used, but the mode order of the standing waves SW is not particularly limited.

Here, a capturing force of the fine particles M by the fluid device 10 determines a lower limit of a size of a fine particle that can be captured by the acoustic convergence, and the larger the capturing force, the smaller the fine particles that can be captured.

The capturing force of the fine particles M by such a fluid device 10 depends on the amplitude of the ultrasonic waves (that is, the drive voltage Vd) and the flow velocity of the fluid S. In a case where the drive voltage Vd is adjusted under a predetermined flow velocity such that the fine particles M having a desired size can be captured, if the flow velocity is changed because of an output variation of the pump 30 or the like, a size range of the fine particles M that can be captured changes. For example, when the flow velocity increases, the fluid S may pass through the formation range of the standing waves SW before the fine particles M having the desired size are sufficiently converged, and the fine particles M having the desired size cannot be sufficiently captured. On the other hand, when the flow velocity decreases, not only the fine particles M having the desired size but also the smaller fine particles M may be converged while the fluid S passes through the formation range of the standing waves SW, and accuracy of the size of the fine particles M that can be captured is reduced.

Therefore, in the embodiment, the flow velocity of the fluid S is measured as described later, and the drive voltage Vd is adjusted according to the measured flow velocity (measured flow velocity V), so that the fine particles M having the desired size can be stably captured.

Method for Controlling Fluid Device

Figure 3:
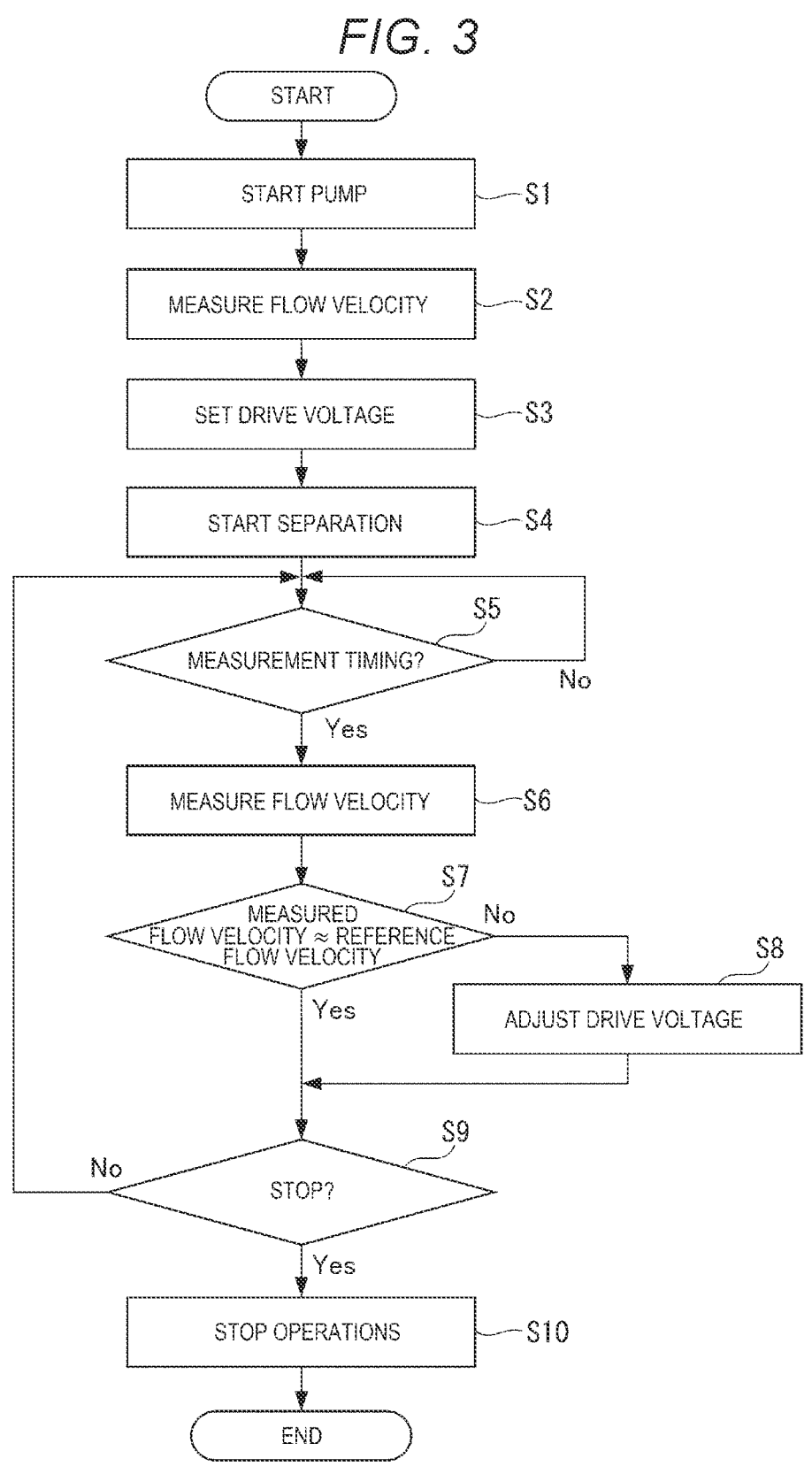
FIG. 3 is a flowchart illustrating a method for controlling the fluid device according to the first embodiment.

An example of the method for controlling the fluid device 10 according to the embodiment will be described with reference to a flowchart of FIG. 3. Before the flowchart is started, the size of the fine particles M to be captured may be set to a predetermined size in advance, or may be set in response to an operation of a user. Further, in the embodiment, in order to simplify the description, it is assumed that the predetermined frequency f for forming the standing waves SW is determined in advance.

First, the pump 30 is started in response to a start operation of the user or the like (step S1). At this time, an output of the pump 30 may be set in response to the operation of the user, or may be set to a predetermined output in advance.

After a predetermined time elapses since the start of the pump 30, the measurement controller 721 outputs a measurement instruction to the flow velocity measurement unit 40, and acquires the flow velocity of the fluid S measured by the flow velocity measurement unit 40 (that is, the measured flow velocity V) (step S2). The predetermined time is, for example, a time required for stabilizing drive of the pump

30. Further, a value of the measured flow velocity V measured in step S2 is stored in the memory 73 as a reference flow velocity Vs.

Next, the drive controller 722 sets the drive voltage Vd according to the measured flow velocity V measured in step S2 (step S3). Accordingly, the amplitude of the ultrasonic waves transmitted from the ultrasonic transmitter 60 is set.

For example, the drive controller 722 specifies the drive table or the arithmetic coefficient corresponding to the size of the fine particles M to be captured from the memory 73, calculates a value of the drive voltage Vd corresponding to the measured flow velocity V measured in step S2 based on the specified drive table or arithmetic coefficient, and sets the calculated value in the drive circuit 71.

Thereafter, the drive circuit 71 starts outputting the drive signal Sd including the predetermined frequency f for forming the standing waves SW and the drive voltage Vd set in step S3 to the ultrasonic transmitter 60 (step S4). Accordingly, the ultrasonic waves are transmitted from the ultrasonic transmitter 60, and the standing waves are formed in the fluid S, so that the separation of the concentrated solution of the fine particles M is started.

The measurement controller 721 determines whether a predetermined measurement timing determined in advance has come (step S5). When determining that the measurement timing has come (when Yes in step S5), the measurement controller 721 outputs a measurement command to the flow velocity measurement unit 40, and acquires the measured flow velocity V measured by the flow velocity measurement unit 40 (step S6). The measurement timing is not particularly limited, and may be set, for example, at a predetermined time interval.

Next, the drive controller 722 determines whether the measured flow velocity V measured in step S6 coincides with the reference flow velocity Vs stored in the memory 73 (step S7). Here, it is assumed that the term "coincides with" is not limited to a complete coincidence, and includes a predetermined error. That is, when |V−Vs| is within an error range set in advance, it is determined that both V and Vs coincide with each other.

When it is determined as No in step S7, the drive controller 722 adjusts the drive voltage Vd according to the measured flow velocity V measured in step S5 (step S8).

Specifically, the drive controller 722 specifies the drive table or the arithmetic coefficient corresponding to the size of the fine particles M to be captured from the memory 73, calculates a value of the drive voltage Vd corresponding to the measured flow velocity V measured in step S6 based on the specified drive table or arithmetic coefficient, and sets the calculated value in the drive circuit 71. Further, the drive controller 722 updates the value of the measured flow velocity V measured in step S6 as the reference flow velocity Vs stored in the memory 73.

If the measured flow velocity V is higher than the reference flow velocity Vs, the drive controller 722 calculates a value larger than a current set value as the drive voltage Vd, and increases the drive voltage Vd set in the drive circuit 71. Accordingly, since a speed at which the fine particles M in the fluid S are converged increases, the fine particles M having the desired size can be sufficiently converged while the fluid S passes through the formation range of the standing waves SW.

On the other hand, when the measured flow velocity V is lower than the reference flow velocity Vs, the drive controller 722 calculates a value smaller than a current set value as the drive voltage Vd, and decreases the drive voltage Vd set in the drive circuit 71. Accordingly, since the speed at which the fine particles M in the fluid S are converged decreases, while the fluid S passes through the formation range of the standing waves SW, it is possible to converge the fine particles M having the desired size and not converge the fine particles M smaller than the desired size.

When it is determined as Yes in step S7, drive of the ultrasonic transmitter 60 is continued by the current drive voltage Vd, and the process shifts to step S9.

Thereafter, the controller 70 determines whether the separation of the concentrated solution is stopped (step S9). For example, when a stop instruction is input by the operation of the user, or when a predetermined time determined in advance elapses, the controller 70 determines as Yes in step S9, and stops operations of the pump 30 and the ultrasonic transmitter 60 (step S10). On the other hand, when the controller 70 determines as No in step S9, the process returns to step S5.

As described above, while the flowchart of FIG. 3 is continued, the drive voltage Vd is controlled according to the measured flow velocity V.

Functions and Effects of Embodiment

As described above, the fluid device 10 according to the embodiment can converge the fine particles M in the fluid S by the acoustic force of the ultrasonic waves transmitted from the ultrasonic transmitter 60. Further, the amplitude of the ultrasonic waves can be appropriately set by adjusting the amplitude of the drive signal Sd according to the measured flow velocity V. As a result, the fine particles M having the desired size can be stably captured.

In the embodiment, the controller 70 increases the amplitude of the drive signal Sd when the measured flow velocity V is higher than the reference flow velocity Vs, and decreases the amplitude of the drive signal Sd when the measured flow velocity V is lower than the reference flow velocity Vs. Accordingly, the fine particles M having the desired size can be more stably captured.

In the embodiment, the controller 70 adjusts the amplitude of the drive signal Sd based on the set size of the fine particles M and the measured flow velocity V. Accordingly, the fine particles M having the desired size can be more suitably recovered.

In the embodiment, the flow velocity measurement unit 40 measures the flow velocity of the fluid S between the separation module 50 and the pump 30 in the flow path 20. In such a configuration, since the pump 30, the flow velocity measurement unit 40, and the separation module 50 can be formed individual to one another, installation and maintenance of each configuration are easy.

The ultrasonic transmitter 60 according to the embodiment includes the vibrator 621 provided in the flow path 20, and can efficiently transmit the ultrasonic waves from the ultrasonic transmitter 60 to the fluid S. Accordingly, power consumption can be limited.

In the embodiment, the ultrasonic transmitter 60 generates the standing waves SW in the fluid S along the direction orthogonal to the flow direction of the fluid S by transmitting the ultrasonic waves to the fluid S. Accordingly, the fine particles M in the fluid S can be converged on the node (or the anti-nodes) of the standing waves SW, and the fine particles M can be suitably recovered.

In the embodiment, the housing 80 that houses the flow velocity measurement unit 40, the ultrasonic transmitter 60, and the controller 70 is further provided, and the housing 80 is provided with the inflow port 21, the concentration outlet 24, and the discharge port 25 of the flow path 20. In such a configuration, the fluid device 10 can be integrally formed, and portability of the fluid device 10 can be improved.

Second Embodiment

Figure 4:
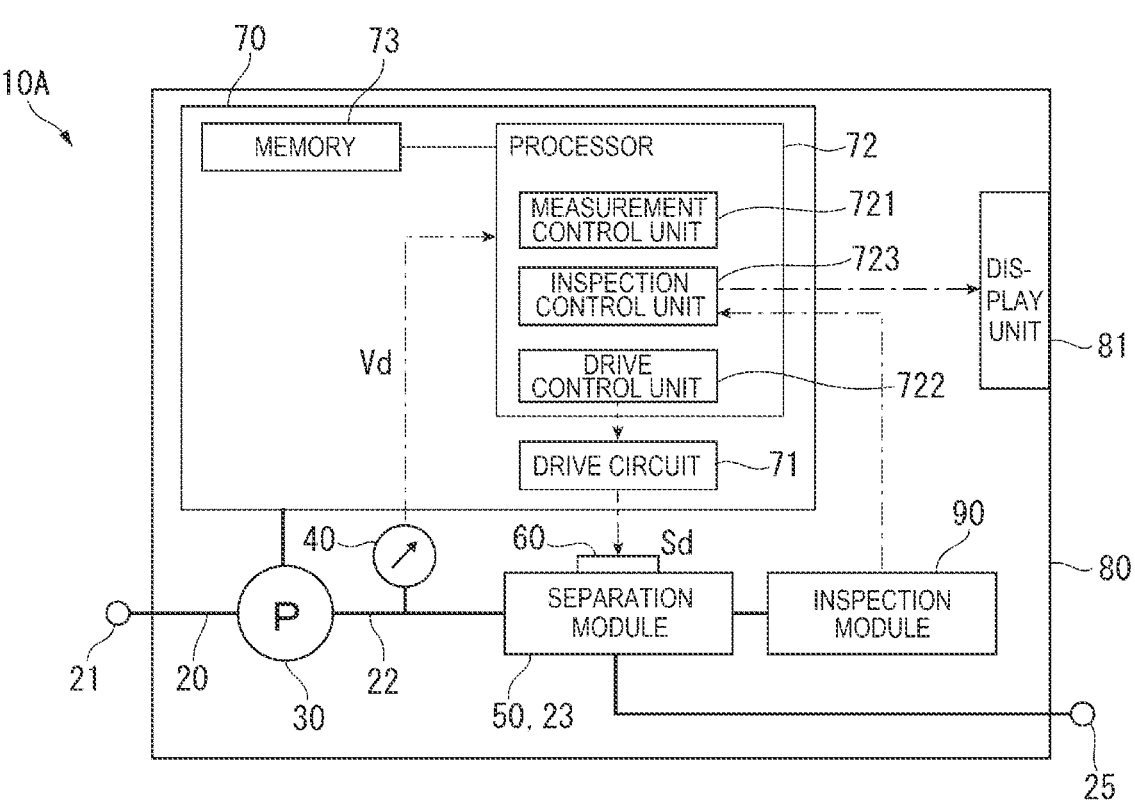
FIG. 4 is a schematic diagram showing a fluid device according to a second embodiment.

A fluid device according to the second embodiment will be described with reference to FIG. 4.

A fluid device 10A according to the second embodiment includes a configuration substantially similar to that of the first embodiment except that a configuration for inspecting the fine particles M is further provided. In the following description, configurations similar to those of the first embodiment are denoted by the same reference numerals, and description thereof will be omitted or simplified.

The fluid device 10A according to the second embodiment includes an inspection module 90 instead of using the concentration outlet 24 of the flow path 20 according to the first embodiment. The inspection module 90 is coupled to the concentration flow path 233 in the separation module 50, recovers the fluid S containing the converged fine particles M (concentrated solution), and acquires various kinds of information on the fine particles M in the recovered concentrated solution.

Further, the processor 72 according to the second embodiment also functions as an inspection controller 723 that controls the inspection module 90 by executing a program stored in the memory 73. The inspection controller 723 analyzes the fine particles M based on the information acquired by the inspection module 90. The inspection controller 723 may display an analysis result on a display unit 81, or may transmit the analysis result to an external terminal via wired communication, wireless communication, or the like.

Types of the inspection and the analysis performed by the inspection module 90 and the inspection controller 723 are not particularly limited. For example, the inspection module 90 and the inspection controller 723 may be implemented as a spectrophotometer such as a cell counter that measures concentration of the fine particles M. Further, the inspection module 90 may include an imaging unit. The inspection controller 723 may analyze the fine particles M based on a captured image. Alternatively, the inspection module 90 may include a laser light source and a spectrometer. The inspection controller 723 may analyze the fine particles M by various kinds of spectroscopy such as absorptiometry and Raman spectroscopy.

A method for controlling the fluid device 10A according to the second embodiment is similar to that of the first embodiment. However, in determination of step S9 of FIG. 3, whether the inspection module 90 recovers sufficient concentrated solution may serve as a reference.

In the fluid device 10A according to the second embodiment described above, the recovered fine particles M can be suitably inspected in addition to the effects of the first embodiment. Particularly, the fluid device 10A according to the second embodiment can be suitably used for an inspection targeting the fine particles M having a specific size in the fluid S containing the fine particles M having various sizes.

Modifications

The present disclosure is not limited to the embodiments described above, and configurations obtained by modifications, improvements, appropriate combinations of the embodiments, and the like within a scope of being capable of achieving an object of the present disclosure are included in the present disclosure.

First Modification

In the embodiments described above, an example in which the flow velocity measurement unit 40 measures the flow velocity of the fluid S between the separation module 50 and the pump 30 has been shown, but the arrangement of the flow velocity measurement unit 40 is not limited thereto.

Figure 5:
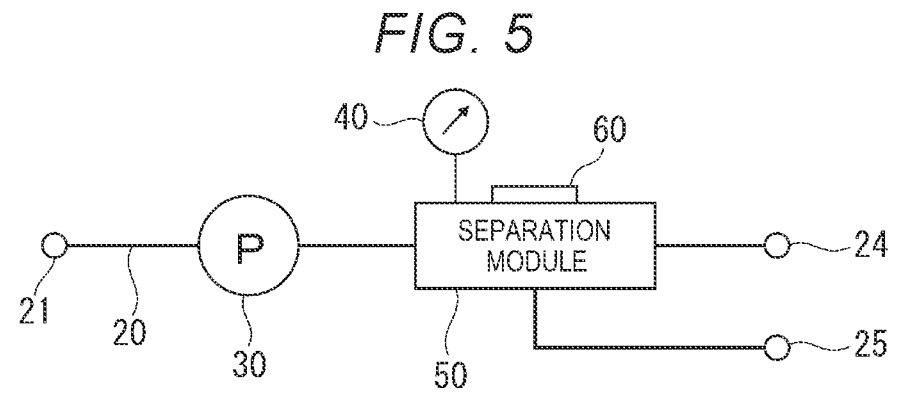

FIG. 5 is a flow path diagram showing an arrangement of the flow velocity measurement unit 40 according to the modification. As shown in FIG. 5, the flow velocity measurement unit 40 may measure the flow velocity of the fluid S in the separation module 50. In this case, the flow velocity measurement unit 40 can be integrally formed with the separation module 50. In the modification, the amplitude of the drive signal Sd can be more accurately adjusted by measuring a flow velocity of the fluid S in the separation module 50.

Figure 6:
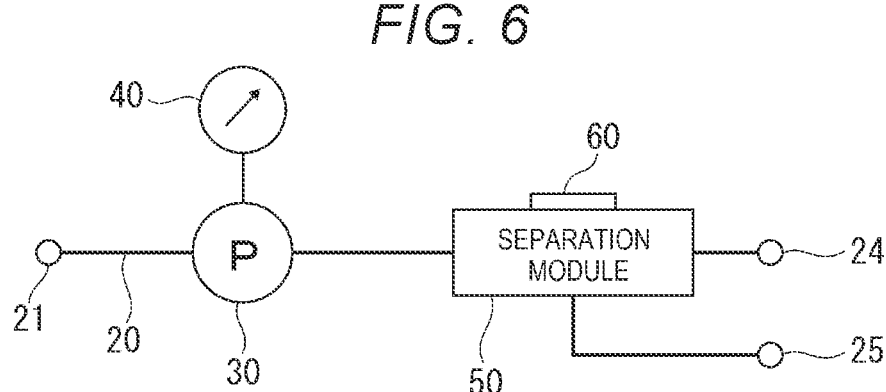
FIG. 6 is a diagram showing a flow path system in a fluid device according to another modification.

FIG. 6 is a flow path diagram showing an arrangement of the flow velocity measurement unit 40 according to another modification. As shown in FIG. 6, the flow velocity measurement unit 40 may measure a flow velocity of the fluid S in the pump 30. In this case, the flow velocity measurement unit 40 can be integrally formed with the pump 30. In the modification, a commercially available pump integrally formed with a flowmeter can be used as the pump 30 and the flow velocity measurement unit 40.

In the embodiments described above, in order to simplify the description, the flow velocity measurement unit 40 is described as a unit that outputs the flow velocity, but the flow velocity measurement unit 40 may be a sensor that detects at least the flow velocity. In this case, the measurement controller 721 may perform an arithmetic process of calculating the flow velocity based on a detection signal input from the flow velocity measurement unit 40.

Second Modification

In the embodiments described above, as the method for controlling the fluid devices 10 and 10A (see FIG. 3), the flow velocity measurement (step S2) is performed by the flow velocity measurement unit 40 in order to initially set the reference flow velocity Vs, but the present disclosure is not limited thereto. For example, an initial value of the reference flow velocity Vs may be set in advance based on the output of the pump 30 or the like. In this case, the drive voltage Vd may be set in advance.

Third Modification

In the embodiments described above, as the method for controlling the fluid devices 10 and 10A (see FIG. 3), after the separation of the concentrated solution is started, the flow velocity measurement (step S6) is repeatedly performed, and the drive voltage Vd is adjusted according to the measured flow velocity V, but the present disclosure is not limited thereto.

For example, after the initial setting (step S3) of the drive voltage Vd is performed according to the measured flow velocity V measured initially, the adjustment of the drive voltage Vd according to the measured flow velocity V (steps S6 to S8) may not be performed.

Fourth Modification

The fluid devices 10 and 10A according to the embodiments described above each include the pump 30 that generates the flow of the fluid S, but may not include such a pump 30. For example, the pump 30 may be disposed outside the housing 80 and provided separately from the fluid devices 10 and 10A. Alternatively, when the fluid S supplied to the fluid devices 10 and 10A flows, the pump 30 may not be provided.

Fifth Modification

The fluid devices 10 and 10A according to the embodiments described above each include the housing 80 that houses the configurations, but may not include such a housing 80.

Sixth Modification

The separation flow path 23 that is a part of the flow path 20 is formed in the separation module 50 according to the embodiments described above, but the present disclosure is not limited thereto, and the entire flow path 20 may be formed in the separation module 50.

Seventh Modification

In the fluid devices 10 and 10A according to the embodiments described above, the configuration of the ultrasonic transmitter 60 is not limited to the above-described configuration.

For example, the ultrasonic transmitter 60 may include a plurality of vibrators 621. In this case, a plurality of opening portions 611 may be provided in an array shape in the element substrate 61, and portions of the vibration film 62 provided at the element substrate 61 that overlap with the opening portions 611 may constitute the vibrators 621. The piezoelectric element 63 is provided at the vibrators 621, so that the ultrasonic waves are transmitted from the vibrators 621.

Further, the ultrasonic transmitter 60 may include a configuration for vibrating a piezoelectric actuator, or may include a configuration for vibrating a vibration plate included in an electrostatic actuator. Such an ultrasonic wave element can generate a vibration by applying the drive signal Sd having a predetermined drive frequency, and can transmit the ultrasonic waves.

Eighth Modification

In the embodiments described above, the standing waves SW are generated in the width direction of the flow path 20 as the direction orthogonal to the flow direction of the fluid S, but the standing waves SW may be generated in a depth direction of the flow path 20.

Further, the fluid devices 10 and 10A according to the embodiments described above are not limited to forming the standing waves SW in the flow path. For example, the fluid devices 10 and 10A only need to operate the fine particles M having the desired size by using the acoustic force of the ultrasonic waves.

SUMMARY OF PRESENT DISCLOSURE

Hereinafter, a summary of the present disclosure will be added.

APPENDIX 1

A fluid device according to the present disclosure includes: a flow path through which a fluid containing a fine particle flows; an ultrasonic transmitter configured to transmit an ultrasonic wave to the fluid in the flow path in response to an input of a drive signal; a flow velocity measurement unit configured to measure a flow velocity of the fluid in the flow path; and a controller configured to control the ultrasonic transmitter. The controller sets an amplitude of the drive signal according to a measured flow velocity that is a flow velocity measured by the flow velocity measurement unit, and inputs the drive signal having the set amplitude to the ultrasonic transmitter.

In such a configuration, the fine particle in the fluid can be operated by an acoustic force of the ultrasonic wave transmitted from the ultrasonic transmitter, and the fine particle can be recovered. Further, the amplitude of the drive signal is adjusted according to the measured flow velocity, so that an amplitude of the ultrasonic wave can be adjusted, and a size of the recovered fine particle can be stabilized.

APPENDIX 2

In the fluid device according to appendix 1, while the ultrasonic transmitter transmits the ultrasonic wave to the fluid, the controller may increase the amplitude of the drive signal when the measured flow velocity is higher than a reference flow velocity, and may decrease the amplitude of the drive signal when the measured flow velocity is lower than the reference flow velocity. Accordingly, the fine particle having the desired size can be stably recovered.

APPENDIX 3

In the fluid device according to appendix 1 or 2, the controller may set the amplitude of the drive signal based on a size of the fine particle and the measured flow velocity. Accordingly, the fine particle having the desired size can be more suitably recovered.

APPENDIX 4

The fluid device according to any one of appendices 1 to 3 may further include: a separation module that is provided with the ultrasonic transmitter and that includes a part of the flow path; and a pump configured to generate a flow of the fluid in the flow path. The flow velocity measurement unit may measure a flow velocity of the fluid between the separation module and the pump in the flow path. In such a configuration, since the pump, the flow velocity measurement unit, and the separation module can be formed individual to one another, installation and maintenance of each configuration are easy.

APPENDIX 5

The fluid device according to any one of appendices 1 to 3 may further include a separation module that is provided with the ultrasonic transmitter and that includes at least a part of the flow path. The flow velocity measurement unit may measure a flow velocity of the fluid in the separation module. In such a configuration, the amplitude of the drive signal for operating the fine particle having the desired size can be more accurately set.

APPENDIX 6

The fluid device according to any one of appendices 1 to 3 may further include a pump configured to generate a flow of the fluid in the flow path. The flow velocity measurement unit may measure a flow velocity of the fluid in the pump. In such a configuration, a commercially available pump integrally formed with a flowmeter can be suitably used.

APPENDIX 7

In the fluid device according to any one of appendices 1 to 6, the ultrasonic transmitter may include a vibrator provided in the flow path, and a piezoelectric element that is provided at the vibrator and that is configured to transmit the ultrasonic wave to the fluid by flexurally vibrating the vibrator. Accordingly, propagation efficiency of the ultrasonic wave from the ultrasonic transmitter to the fluid can be improved, and power consumption can be limited.

APPENDIX 8

In the fluid device according to any one of appendices 1 to 7, the ultrasonic transmitter may generate a standing wave in the fluid along a direction orthogonal to a flow direction of the fluid by transmitting the ultrasonic wave to the fluid. Accordingly, the fine particle in the fluid can be converged on a node (or anti-nodes) of the standing wave, and the fine particle can be more suitably recovered.

APPENDIX 9

The fluid device according to any one of appendices 1 to 8 may further include a housing that houses the flow velocity measurement unit, the ultrasonic transmitter, and the controller, and the housing may be provided with an inflow port through which the fluid flows into the flow path and one or more discharge ports through which the fluid flows out from the flow path. In such a configuration, the fluid device can be integrally formed, and portability of the fluid device can be improved.

APPENDIX 10

The fluid device according to any one of appendices 1 to 6 may further include an inspection module configured to recover the fine particle converged by the ultrasonic wave and to inspect the recovered fine particle.

APPENDIX 11

A method for controlling a fluid device according to the present disclosure is a method for controlling a fluid device including: a flow path through which a fluid containing a fine particle flows, an ultrasonic transmitter configured to transmit an ultrasonic wave to the fluid in the flow path in response to an input of a drive signal, and a flow velocity measurement unit configured to measure a flow velocity of the fluid in the flow path. The method for controlling the fluid device includes: setting an amplitude of the drive signal according to a measured flow velocity that is a flow velocity measured by the flow velocity measurement unit, and inputting the drive signal having the set amplitude to the ultrasonic transmitter. According to such a method, a size of the recovered fine particle can be stabilized.

What is claimed is:

1. A fluid device comprising:
   a flow path through which a fluid containing fine particles flows;
   a separation module having a module inflow port, a first module discharge port, and a second module discharge port along the flow path, the fluid flowing into an inside space of the separation module via the module inflow port and flowing out from the first and second module discharge ports, the inside space being surrounded by a first wall, a second wall facing the first wall, and a side wall having the module inflow port and the first and second module discharge ports;
   an ultrasonic transmitter including:
      a vibrator formed in a part of the first wall of the separation module; and
      a piezoelectric element provided on the vibrator and configured to transmit an ultrasonic wave to the fluid in the flow path by vibrating the vibrator in response to an input of a drive signal;

a flow velocity measurement unit configured to measure a flow velocity of the fluid in the flow path; and a controller configured to control the ultrasonic transmitter, wherein the controller is further configured to:

set an amplitude of the drive signal according to the flow velocity; and input the drive signal having the set amplitude to the ultrasonic transmitter to converge the fine particles in the fluid by the ultrasonic wave, and the fluid having the converged fine particles is discharged from the first module discharge port, and the fluid without having the converged fine particles is discharged from the second module discharge port.

2. The fluid device according to claim 1, wherein while the ultrasonic transmitter transmits the ultrasonic wave to the fluid, the controller is further configured to:

increase the amplitude of the drive signal when the flow velocity is higher than a reference flow velocity; and decrease the amplitude of the drive signal when the flow velocity is lower than the reference flow velocity.

3. The fluid device according to claim 1, wherein the controller is further configured to set the amplitude of the drive signal based on a size of the fine particles and the flow velocity.

4. The fluid device according to claim 1, further comprising:

a pump configured to generate a flow of the fluid in the flow path, wherein the separation module includes at least a part of the flow path, and the flow velocity measurement unit measures the flow velocity of the fluid between the separation module and the pump in the flow path.

5. The fluid device according to claim 1, wherein the flow velocity measurement unit measures the flow velocity of the fluid in the separation module.

6. The fluid device according to claim 1, further comprising:

a pump configured to generate a flow of the fluid in the flow path, wherein the flow velocity measurement unit measures the flow velocity of the fluid in the pump.

7. The fluid device according to claim 1, wherein the ultrasonic transmitter is configured to generate a standing wave in the fluid along a direction orthogonal to a flow direction of the fluid by transmitting the ultrasonic wave to the fluid.

8. The fluid device according to claim 1, further comprising:

a housing that houses the flow velocity measurement unit, the separation module, the ultrasonic transmitter, and the controller, wherein the housing is provided with an inflow port through which the fluid flows into the flow path and one or more discharge ports through which the fluid flows out from the flow path.

9. The fluid device according to claim 1, further comprising:

an inspection module configured to recover the fine particles converged by the ultrasonic wave in the separation module and to inspect the recovered fine particles.

10. A method for controlling a fluid device, the fluid device including:

a flow path through which a fluid containing fine particles flows;

a separation module having a module inflow port, a first module discharge port, and a second module discharge port along the flow path, the fluid flowing into an inside space of the separation module via the module inflow port and flowing out from the first and second module discharge ports, the inside space being surrounded by a first wall, a second wall facing the first wall, and a side wall having the module inflow port and the first and second module discharge ports;

an ultrasonic transmitter including:

a vibrator formed in a part of the first wall of the separation module; and a piezoelectric element provided on the vibrator and configured to transmit an ultrasonic wave to the fluid in the flow path by vibrating the vibrator in response to an input of a drive signal; and a flow velocity measurement unit configured to measure a flow velocity of the fluid in the flow path, the method for causing a processor to execute a process, the method comprising executing on the processor the steps of:

setting an amplitude of the drive signal according to the flow velocity; and inputting the drive signal having the set amplitude to the ultrasonic transmitter to converge the fine particles in the fluid by the ultrasonic wave, and the fluid having the converged fine particles is discharged from the first module discharge port, and the fluid without having the converged fine particles is discharged from the second module discharge port.

* * * * *